United States Patent [19]

Odaka et al.

[11] Patent Number: 5,676,833
[45] Date of Patent: Oct. 14, 1997

[54] HIGH-TEMPERATURE CERAMIC FILTER

[75] Inventors: Fumio Odaka, Niiza; Eigo Tanuma, Yokohama, both of Japan

[73] Assignee: Bridgestone Corporation, Tokyo, Japan

[21] Appl. No.: 597,403

[22] Filed: Feb. 8, 1996

[30] Foreign Application Priority Data

Feb. 8, 1995 [JP] Japan ................................ 7-043528

[51] Int. Cl.$^6$ .................................................. B01D 39/00
[52] U.S. Cl. ............................ 210/500.26; 210/500.25; 210/496; 210/503; 210/510.1; 264/41; 264/42; 264/43
[58] Field of Search .................... 210/500.25, 500.26, 210/496, 503, 510.1; 264/41, 42, 43

[56] References Cited

U.S. PATENT DOCUMENTS 4,278,544  7/1981  Takashima ........................... 210/503
4,697,632  10/1987  Lirones ............................. 210/510.1

FOREIGN PATENT DOCUMENTS

| 0463437 | 1/1992 | European Pat. Off. . |
| 0586102 | 3/1994 | European Pat. Off. . |
| 5051278 | 3/1993 | Japan . |
| 2227185 | 7/1990 | United Kingdom . |

*Primary Examiner*—Ana Fortuna
*Attorney, Agent, or Firm*—Sughrue, Mion, Zinn, Macpeak & Seas, PLLC

[57] ABSTRACT

A high-temperature ceramic filter having a three-dimensional reticulated skeleton structure is prepared by applying a ceramic slurry to a synthetic resin foam having an open cell three-dimensional reticulated skeleton structure, followed by drying and firing. The ceramic slurry contains 20-40 parts by weight of aluminum titanate, 40-60 parts by weight of mullite, 2-20 parts by weight of alumina, and agalmatolite. The filter is useful for the filtration of molten metals.

11 Claims, No Drawings

HIGH-TEMPERATURE CERAMIC FILTER

BACKGROUND OF THE INVENTION

1. Field of the Invention

This invention relates to a high-temperature ceramic filter for use in the filtration of molten metals, typically molten stainless steel alloy, molten steel and molten cast steel.

2. Prior Art

Molten metals generally contain impurities in the form of inclusions which have not been removed during refinement. In order to obtain high-grade metal stocks intended for thin plate manufacture, thin wire drawing, and precision casting, it is necessary to remove such inclusions, typically by passing the molten metals through filters.

In the prior art, for the filtration of molten metals, ceramic foams are used having internal open cells. Such conventional ceramic filters, however, have many problems on use for the filtration of molten stainless steel alloy, molten steel and molten cast steel and few filters heretofore available are satisfactory for practical use. This is because the filters are subject to very rigorous conditions in terms of temperature in that the molten metal to be filtered is as hot as about 1,500° C. or higher, which requires a strict choice of the material and structure capable of withstanding thermal shocks generated at the instant when the hot molten metal reaches the filter as well as damages and wear due to collision with the hot molten metal. There are known filters formed of oxide and non-oxide system ceramics.

One known example of non-oxide system ceramics is a filter based on silicon carbide as disclosed in Japanese Patent Application Kokai (JP-A) No. 197829/1985. This filter is resistant against thermal shocks, but its use in an ambient atmosphere is limited to 1,450° C. above which silicon carbide decomposes. Then the filter is compatible with molten cast steel, but not with the casting of stainless steel alloy which requires the filter to withstand a temperature of at least 1,500° C., sometimes at least 1,600° C. during casting. In addition, long-term operation is not recommended since silicon carbide can react with iron at such elevated temperatures.

For oxide system ceramics, JP-A 137073/1991 discloses a ceramic composition based on zirconia. This ceramic undergoes crystallographic transformation with a temperature change due to the presence of monoclinic system zirconia, generating cracks. The ceramic also has a high coefficient of thermal expansion due to the co-presence of isometric system crystals so that its spalling resistance is below expectation. To prohibit cracking due to crystallographic transformation, it was proposed to add alumina to zirconia as disclosed in JP-A 141666/1986. This composition has a high coefficient of thermal expansion due to the presence of alumina, and cannot accommodate for the filtration of molten metal at 1,500° C. or higher as required for stainless steel alloy casting.

Also, JP-A 278235/1987 discloses a silica/alumina/zirconia system, which will fail upon instantaneous casting of molten metal at 1,500° C. or higher since it has a high coefficient of thermal expansion and cannot tolerate thermal shocks.

As understood from the foregoing description, the thermal shock resistance or the ability to withstand heat of molten metal is correlated with not only heat resistance, but also a coefficient of thermal expansion as expressed by the following formula:

$$R = S(1-v)\lambda/E\alpha$$

wherein R is a coefficient of thermal shock resistance, S is a strength, $\alpha$ is a coefficient of thermal expansion, $v$ is a Poisson's ratio, E is a Young's modulus, and $\lambda$ is a heat transfer rate.

Therefore, materials having a low coefficient of thermal expansion must be used where thermal shock resistance is required. When hot molten metal is cast on the above-mentioned exemplary materials at room temperature, they cannot tolerate such a great temperature difference and fail because they have a great coefficient of thermal expansion irrespective of sufficient heat resistance.

In this regard, there were proposed systems using cordierite or aluminum titanate having a low coefficient of thermal expansion. Although cordierite itself has a coefficient of thermal expansion of $2\times10^{-6}/°$ C. at 1,000° C. which is as low as about ¼ or ⅓ of those of the above-mentioned zirconia and alumina and is thus useful as a thermal shock resistant material, the ceramic filter based on cordierite is practically limited to molten metals at temperatures below 1,300° C. because cordierite has a relatively low melting point of 1,450° C.

An aluminum titanate base ceramic is disclosed in JP-A 74981/1988. According to this disclosure, a powder raw material and a blowing agent are concurrently blended and expanded and fired to form a porous body. Since the blowing agent in the form of an organic material is blended in an amount as large as about 40% by weight, the ceramic forming the skeleton after firing has an inhomogeneous structure rather than a dense structure. Since it is difficult to control the cells or network formed by blowing, there is obtained a porous body across which a considerable pressure loss occurs.

We previously proposed in JP-A 56553/1994 a ceramic filter having a three-dimensional reticulated structure of aluminum titanate/mullite/alumina. Although this ceramic filter is advantageously used at high temperatures of 1,500° C. or higher, it is limited in use because aluminum titanate, which is one of filter-forming components, is expensive. There is a need for ceramic filters of higher strength enough to accommodate for large scale casting.

SUMMARY OF THE INVENTION

Therefore, an object of the present invention is to provide an inexpensive high-temperature ceramic filter which has heat resistance, low thermal expansion, thermal shock resistance against molten metals above 1,500° C. such as molten stainless steel alloy, strength, minimized clogging, and a low pressure loss, and is thus effective for the filtration of molten metals.

Making investigations on a three-dimensional reticulated ceramic foam having open cells which is prepared by applying a ceramic slurry to a substrate in the form of a synthetic resin foam, removing excess slurry, drying and firing the coated substrate, the inventors have found that the above object can be attained by using a ceramic slurry comprising 20 to 40 parts by weight of aluminum titanate, 40 to 60 parts by weight of mullite and 2 to 20 parts by weight of alumina, and agalmatolite.

As is well known, a three-dimensional reticulated ceramic foam having open cells is prepared by applying a ceramic slurry to a substrate in the form of a synthetic resin foam, removing excess slurry, drying and firing the coated substrate. In order that the ceramic foam have a sufficient strength to withstand filtration of molten metal, a large quantity of the ceramic slurry must be applied to the synthetic resin foam. Thick coating often leads to clogging of open cells. Quite unexpectedly, when the ceramic slurry is of a system comprising aluminum titanate, mullite, alumina, and agalmatolite in a blending proportion as defined above, and particularly when agalmatolite is contained in an amount of 0.13 to 1.0 mol per mol of alumina, this ceramic slurry has good slurry properties so that there may be obtained a clogging-free ceramic filter having a bulk specific gravity of 0.5 to 1 and 4 to 20 pores per 2.5 cm. This ceramic filter has a low pressure loss and good filtering performance. As agalmatolite thermally decomposes during firing, silica resulting from agalmatolite will react with alumina to form mullite. This leads to quite unexpected results. First, the fired product has a lower coefficient of thermal expansion than expected from simple blending of these ceramic components in the same blending proportion. Secondly, since the proportion of mullite is increased, heat resistance is enhanced. Since the mullite created during firing is acicular grains, strength is enhanced due to their tanglement to the structure. The low coefficient of thermal expansion, combined with enhanced heat resistance and strength, permits the ceramic material to withstand thermal shocks by molten metals at about 1,500° C. or higher, inter alia molten stainless steel alloy at about 1,600° C. In addition, the ceramic material is resistant against attack by molten metals. The amount of expensive aluminum titanate used is reduced. Then this ceramic filter is advantageously used for the filtration of molten metals.

Accordingly, the present invention provides a high-temperature ceramic filter having a three-dimensional reticulated skeleton structure prepared by applying a ceramic slurry to a synthetic resin foam having an open cell three-dimensional reticulated skeleton structure, drying and firing the coated substrate, characterized in that the ceramic slurry is comprised of 20 to 40 parts by weight of aluminum titanate, 40 to 60 parts by weight of mullite, 2 to 20 parts by weight of alumina, and agalmatolite.

DETAILED DESCRIPTION OF THE INVENTION

The high-temperature ceramic filter of the invention is formed from a ceramic composition of an aluminum titanate-mullite-alumina-agalmatolite system.

Aluminum titanate has higher heat resistance and a lower thermal expansion than cordierite. Aluminum titanate is blended in an amount of about 20 to 40 parts, preferably about 25 to 35 parts by weight per 100 parts by weight of the ceramic composition. Less than 20 parts by weight of aluminum titanate provides less contribution to the lowering of a coefficient of thermal expansion. More than 40 parts by weight of aluminum titanate will add to the cost and can invite a lowering of strength due to the crystallographic transformation of aluminum titanate during firing.

The aluminum titanate is preferably in powder form having a mean particle size of about 1 to 10 μm. Also preferably it contains an iron compound such as iron oxide in an amount of 1 to 4% by weight calculated as iron element. Without an iron compound added, aluminum titanate has the crystallographic behavior that intragranular cracks develop on cooling after heating for firing. Such cracks cause a substantial lowering of mechanical strength or a failure. The addition of an iron compound is effective for preventing this behavior. Although the exact mechanism is unknown, the iron compound is effective for preventing cracks from generating due to crystallographic transformation.

Mullite is relatively low in thermal expansion and is used for the purpose of stabilizing a ceramic slurry and the heat resistance thereof. Mullite is blended in an amount of about 40 to 60 parts, preferably about 45 to 55 parts by weight per 100 parts by weight of the ceramic composition. On this basis, less than 40 parts of mullite will detract from heat resistance stability whereas more than 60 parts of mullite will render a ceramic composition difficult to fire, resulting in low strength.

Alumina is added as a firing binder and for synthesizing mullite and effective for improving the heat resistance and strength of the resulting ceramic. Alumina is blended in an amount of about 2 to 20 parts, preferably about 4 to 12 parts by weight per 100 parts by weight of the ceramic composition. Less than 2 parts of alumina is less effective as a firing binder, resulting in a fired ceramic material having low strength. More than 20 parts of alumina contributes to higher strength, but provides a coefficient of thermal that is too high, detracting from thermal shock resistance.

According to the present invention, agalmatolite is blended with aluminum titanate, mullite, and alumina. Agalmatolite is an essential component for forming mullite by bonding with alumina during firing. It is composed mainly of $Al_2O_3 \cdot 4SiO_2 \cdot H_2O$. Agalmatolite may be synthesized from alumina and silica or commercially available agalmatolite may be used. Agalmatolite pyrolyzes into silica and alumina midway of firing, among which alumina is entirely consumed to form mullite ($3Al_2O_3 \cdot 2SiO_2$). The ceramic lowers its coefficient of thermal expansion in accordance with formation of mullite. The excess silica vitrifies to exert a binder function, contributing to strength.

Agalmatolite is preferably blended in an amount of 0.13 to 1.0 mol per mol of alumina. On this basis, less than 0.13 mol of agalmatolite means that alumina is excessive and a fully low coefficient of thermal expansion would not sometimes be expected. More than 1.0 mol of agalmatolite means that excess silica is formed in greater amounts so that the ceramic would be vulnerable to attack by molten metals.

Mullite, alumina, and agalmatolite mentioned above preferably have a mean particle size of about 1 to 30 μm.

The high-temperature ceramic filter of the invention has a bulk specific gravity of 0.4 to 1.0, preferably 0.6 to 0.8, and contains 4 to 30 pores per linear 2.5 cm, preferably 6 to 13 pores per linear 2.5 cm in order to ensure adequate properties for the filtration of molten metal. A bulk specific gravity of less than 0.4 corresponds to skeletons that are too thin to tolerate the pressure of molten metal. A bulk specific gravity of more than 1.0 would lead to frequent clogging and hence a higher pressure loss, which requires a longer filtration time or invites less smooth outflow of molten metal. A filter containing less than 4 pores per 2.5 cm would be insufficient to remove inclusions from molten metal whereas a filter containing more than 30 pores per 2.5 cm would lead to a higher pressure loss, which requires a longer filtration time or invites less smooth outflow of molten metal.

The ceramic filter generally has a coefficient of thermal expansion of up to $3.5 \times 10^{-6}/°$ C. A coefficient of thermal expansion above this limit would lead to lower thermal shock resistance, failing to attain the objects of the invention.

The high-temperature ceramic filter of the invention is prepared by a conventional method involving the steps of starting with a synthetic resin foam as a substrate, applying a slurry of the above-defined ceramic composition to the substrate, removing excess slurry, drying and firing the coated substrate. The preferred synthetic resin foam is a flexible reticulated (cell membrane-free) polyurethane foam.

The slurry is prepared by dispersing the ceramic components in water together with a binder such as polyvinyl alcohol and carboxymethylcellulose (CMC) and a deflocculant such as quebrachio. Since the ceramic composition contains aluminum titanate, mullite, alumina, and agalmatolite with the alumina serving as a firing binder, the firing temperature is as high as about 1,650° C. to about 1,750° C. In general, firing at 1,600° C. or higher requires a furnace whose structure is significantly different from ordinary firing furnaces designed for lower than 1,600° C. and thus leads to cost increases including both installation investment and maintenance cost. It is thus recommended to use a firing aid, for example, oxides of alkali and alkaline earth metals. The metal oxide firing aid is preferably added in an amount of 0.05 to 3 parts by weight per 100 parts by weight of the ceramic composition whereby the firing temperature can be lowered by about 30° to 100° C. Less than 0.05 parts of the firing aid would be ineffective. More than 3 parts of the firing aid can further lower the firing temperature, but would promote alumina grain growth or act as a flux component to vitrify alumina, adversely affecting a coefficient of thermal expansion and strength.

The slurry has a viscosity which may be adjusted by the amount of water in accordance with the desired cell size and bulk specific gravity of a ceramic porous body although the viscosity is generally in the range of 150 to 250 poise, especially 170 to 200 poise.

In the slurry is immersed a synthetic resin foam, for example, a polyurethane foam of a three-dimensional reticulated (cell membrane-free network) skeleton structure having 4 to 30 cells per 2.5 cm. After application of the slurry, excess slurry is removed from the foam by any suitable method such as roll pressing, centrifugal separation and air blowing. If desired, the slurry is diluted and applied to the substrate as by spraying.

The slurry applied foam is then dried and fired at a temperature of about 1,600° to 1,750° C. Firing can be done at about 1,500° to 1,720° C. when a firing aid as mentioned above is additionally blended.

To protect the ceramic filter from damage, the filter should have thicker and rounder skeletons from a structural aspect. To this end, the bulk specific gravity must be increased. In preparing a ceramic filter from a system using a synthetic resin foam as a substrate, there is a tendency that an increase in bulk specific gravity is accompanied by clogging. As proposed in our JP-A 56553/1994, this problem is overcome by replacing mullite by an electrically fused one because clogging can be prevented so that a pressure loss is improved without detracting from other physical properties. However, use of electrically fused mullite would add to the cost. Then we have found that for providing thick skeletons, it is effective to spray coat to skeletons a diluted one of the same slurry as applied to skeletons. More particularly, the slurry is applied to a foam such that the slurry applied foam after removal of excess slurry may have a bulk specific gravity which is about 20% lower than the bulk specific gravity as fired. Thereafter the diluted slurry is spray coated to the slurry applied foam to make up the shortage of weight. This ensures that a thick skeleton ceramic filter is obtained after firing.

EXAMPLE

Examples of the present invention are given below by way of illustration and not by way of limitation. All parts are by weight.

Example 1

To 30 parts of aluminum titanate powder, 51 parts of mullite, 6 parts of alumina, and 13 parts (0.16 mol per mol of alumina) of agalmatolite were added 4 parts of polyvinyl alcohol, 0.1 part of quebrachio, 0.05 part of calcium carbonate and 19 parts of water. There was obtained a ceramic slurry having a viscosity of 160 poise. In the slurry was immersed a polyurethane foam having a three-dimensional reticulated (cell membrane-free network) skeleton structure dimensioned 7.5×7.5×2 cm and containing 6 cells per 2.5 cm.

Excess slurry was removed by means of a roll. The slurry that was squeezed out was diluted to 30 poise and spray coated to the foam such that the coverage weight by spraying might be 10% of the coverage weight by immersion. The foam was dried for 6 hours at 60° C. The foam was then fired at 1,600° C., obtaining a ceramic filter of 6.7×6.7×1.9 cm.

The ceramic filter was measured for bulk specific gravity, a coefficient of thermal expansion ($\mu$) over 25 to 1,000° C., and a pressure loss by suction at 20 m/s. The filter was also tested for resistance against thermal shocks on water immersion. The thermal shock resistance was tested by maintaining filter samples at predetermined temperatures of 600° C., 800° C. and 1,000° C. for 20 minutes, dropping the samples into water at room temperature, taking out and drying the samples, cutting the samples to a width of 35 mm, and bending the specimens at a span of 60 mm to measure flexural strength.

The results are shown in Table 1.

Examples 2–4 & Comparative Example 1

Ceramic filters were prepared by the same procedure as in Example 1 except that the amounts of aluminum titanate, mullite, alumina, and agalmatolite were changed as shown in Table 1. Physical properties were similarly measured. The results are also shown in Table 1.

TABLE 1

| | Example | | | Comparative Example |
|---|---|---|---|---|
| Composition (pbw) | 1 | 2 | 3 | 1 |
| Aluminum titanate | 30 | 30 | 20 | 30 |
| Mullite | 51 | 50 | 60 | 50 |
| Alumina | 6 | 13.7 | 4.8 | 20 |
| Agalmatolite | 13 | 6.3 | 15.2 | — |
| Agalmatolite/alumina (molar ratio) | 0.61 | 0.13 | 0.90 | — |
| Bulk specific gravity | 0.62 | 0.61 | 0.58 | 0.61 |
| $\mu$ ($10^{-6}$/°C.) | 2.8 | 3.1 | 2.9 | 3.9 |
| Pressure loss (mmAq) | 38 | 40 | 37 | 43 |
| Thermal shock resistance (kg/cm$^2$) $\Delta$T°C. | | | | |
| 0 | 20 | 18 | 16 | 17 |
| 600 | 17 | 17 | 15 | 18 |
| 800 | 20 | 19 | 13 | 16 |
| 1000 | 16 | 18 | 15 | 7 |
| Softening temp. (°C.) | 1560 | 1580 | 1520 | 1540 |

ADVANTAGES

The high-temperature ceramic filters of the invention have improved heat resistance, a low coefficient of thermal expansion, improved thermal shock resistance and a low pressure loss. The filters are thus advantageously used for the filtration of molten metals, typically molten stainless steel alloy, molten steel and molten cast steel.

Although some preferred embodiments have been described, many modifications and variations may be made thereto in the light of the above teachings. It is therefore to be understood that within the scope of the appended claims, the invention may be practiced otherwise than as specifically described.

We claim:

1. A high-temperature ceramic filter having a three-dimensional reticulated skeleton structure which is prepared by applying a ceramic slurry to a synthetic resin foam having an open cell three-dimensional reticulated skeleton structure, followed by drying and firing, the ceramic slurry comprising 20 to 40 parts by weight of aluminum titanate, 40 to 60 parts by weight of mullite, 2 to 20 parts by weight of alumina, 0.13 to 1.0 mol of agalmatolite per mol of alumina, and said ceramic filter having a bulk specific gravity of 0.40 to 1.0 and containing 4 to 30 pores per linear 2.5 cm.

2. The ceramic filter of claim 1 wherein the agalmatolite is mineral or synthetic agalmatolite composed mainly of $Al_2O_3 \cdot 4SiO_2 \cdot H_2O$.

3. The ceramic filter of claim 1 wherein the aluminum titanate is one containing 1 to 4% by weight of iron element.

4. The ceramic filter of claim 3, wherein said aluminum titanate has a mean particle size in the range of 1 to 10 μm.

5. The ceramic filter of claim 1 having a coefficient of thermal expansion of up to $3.5 \times 10^{-6}/°C$.

6. A high-temperature ceramic filter of claim 1 which is prepared by applying a first ceramic slurry to a synthetic resin foam, removing an excess of the slurry, spraying a second ceramic slurry of the same composition as the first slurry, but diluted with water to the skeleton surface of the foam, and firing it.

7. The ceramic filter of claim 1, wherein said mullite comprises 45 to 55 parts by weight per 100 parts by weight of said ceramic composition.

8. The ceramic filter of claim 1, wherein said aluminum titanate is blended in an amount comprising 25 to 35 parts by weight per 100 parts by weight of said ceramic composition.

9. The ceramic filter of claim 1, wherein said alumina is blended in an amount comprising 4 to 12 parts by weight per 100 parts by weight of said ceramic composition.

10. The ceramic filter of claim 1, wherein said bulk specific gravity is in the range of 0.6 to 0.8 and containing 6 to 13 pores per linear 2.5 cm.

11. The ceramic filter of claim 1, wherein said mullite, alumina and agalmatolite each have a mean particle size in the range of 1 to 30 μm.

* * * * *